United States Patent [19]

Mollet

[11] 3,925,608

[45] Dec. 9, 1975

[54] ARRANGEMENT FOR SIGNAL DELAY, PARTICULARLY FOR USE IN A VERTICAL APERTURE CORRECTOR FOR TELEVISION

[75] Inventor: Prudent Eduardus Jacobus Mollet, Eindhoven, Netherlands

[73] Assignee: U.S. Philips Corporation, New York, N.Y.

[22] Filed: June 27, 1973

[21] Appl. No.: 373,945

[30] Foreign Application Priority Data

July 8, 1972 Netherlands ...................... 7209540

[52] U.S. Cl. .......................... 178/7.1; 178/DIG. 25

[51] Int. Cl.² ........................................ H04N 3/16

[58] Field of Search ...................... 178/DIG. 25, 7.1

[56] References Cited

UNITED STATES PATENTS

| | | | |
|---|---|---|---|
| 2,929,870 | 3/1960 | Gibson et al. | 178/DIG. 25 |
| 3,546,372 | 12/1970 | Dischert et al. | 178/DIG. 25 |

OTHER PUBLICATIONS

"The Mark VIII Colour Camera–Aperture Correction Fac.," by A. Fremont, Sound and Vision Broadcast, Vol. 12, No. 2, (pp. 17–21 inc.), 1971.

*Primary Examiner*—Robert L. Griffin
*Assistant Examiner*—R. John Godfrey
*Attorney, Agent, or Firm*—Frank R. Trifari; Henry I. Steckler

[57] ABSTRACT

An arrangement for signal delay suitable for use in a television vertical aperture corrector in which an image signal which is delayed once and twice a line period, but which is further identical is derived from an input image signal. To this end an AM modulated carrier is used whose amplitude is maintained constant by means of a control circuit which is responsive to the black level in the image signal. The control circuit is active as a clamping circuit which feeds a control voltage back to the high-frequency circuit. The temperature-dependent damping in the delay circuits is thus corrected.

10 Claims, 2 Drawing Figures

Figure 1:
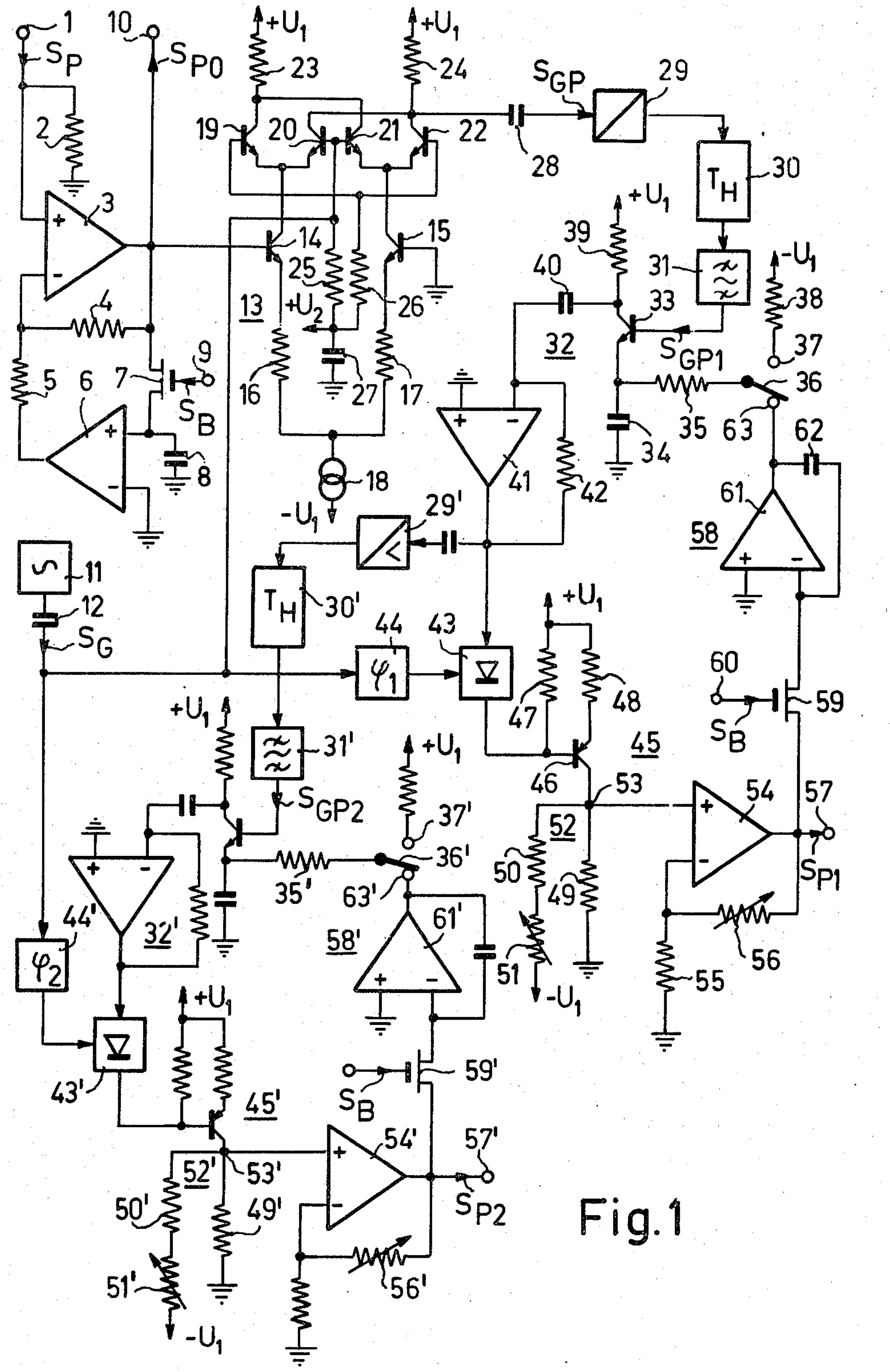

ARRANGEMENT FOR SIGNAL DELAY, PARTICULARLY FOR USE IN A VERTICAL APERTURE CORRECTOR FOR TELEVISION

The invention relates to an arrangement for signal delay, particularly for use in a vertical aperture corrector for television, suitable for supplying at least one image signal which is delayed at least one line period, and in which the undelayed and the delayed image signals must furthermore be substantially identical, said arrangement being provided with a high frequency circuit including a modulator for modulating a carrier with the image signal to be delayed and including a delay circuit and a demodulator following the modulator, said demodulator being connected to a low frequency amplifier whose output supplies the delayed image signal.

The necessity and method of performing vertical aperture correction in television is known. By instantaneously combining an undelayed image signal, a signal delayed once and a signal delayed twice in the vertical aperture corrector, an aperture correction signal is obtained which is added to the image signal delayed once. When the image signal thus aperture-corrected is displayed, the contours and details occurring in the vertical direction on a display screen become manifest in an improved manner.

When deriving the aperture correction signal it is required that the three successively available image signals are identical. The delay performed must certainly not affect the signal level and the signal amplitude and only a pure signal delay may occur. For the level the so-called black level is considered while the amplitude then corresponds to the peak white value. When a level or amplitude variation occurs, the result is that an erroneous correction signal is derived. Such a variation results in an extra, incorrect contribution in the correction signal. Instead of an image quality improvement a deterioration is the result; this applies to both monochrome and colour television.

In colour television employing three image signals each representing a colour, for example, red, green and blue, the aperture correction signal is derived from only one, for example, the green image signal and for performing the correction that it is added to all three image signals which are delayed once. When assuming that the red, green and blue image signals are equal, that is to say, when a white image appears upon display the three image signals delayed once should likewise be equal. However, when due to the performed delays level or amplitude variations are introduced, the image is no longer white but discoloured.

To prevent the said two errors it is required that the image signals only undergo an exact delay and are furthermore identical.

To be able to perform the delay, the image signal must be adapted to the delay circuit; the described high-frequency circuit is used for this purpose. When using a glass delay line as a delay circuit, amplitude modulation may be used while frequency modulation may be considered for an embodiment using a magnetic disc or tape memory. Apart from the specific embodiment of the delay circuit and the method of modulation it can be said that, inter alia, ageing phenomena and temperature fluctuations will exert influence.

In, for example, a glass delay line a higher temperature results in a lower damping so that the demodulator receives a signal which is relatively too large. A lower temperature resulting in a higher damping causes a signal which is too weak. It has been proposed to compensate for the temperature influence of the damping by an oppositely directed, equal signal influence in the low frequency amplifier, for example, with the aid of a combination of transistors of the npn and pnp-types. It will be evident that the realization of equal, oppositely directed influences is a very difficult matter. In this example the said ageing phenomena have been left out of consideration.

When using a disc or tape memory, thermal or mechanical variations in disc rotational speed or tape speed occur.

An object of the invention is to provide an arrangement in which it is ensured in a simple manner that a delayed image signal, apart from the delay, is furthermore identical to the undelayed image signal. To this end the arrangement according to the invention is characterized in that the output of the low-frequency amplifier is connected to a control circuit which, as a clamping circuit, brings a black level in the supplied image signal to a reference potential and, as a comparator circuit, applies a control voltage to an output terminal as a function of the difference between the reference potential and the black level in the delayed image signal present during a line blanking period before clamping, said control voltage being applied to the high frequency circuit for determining the carrier applied to the demodulator when the black level is present in the image signal.

Figure 2:
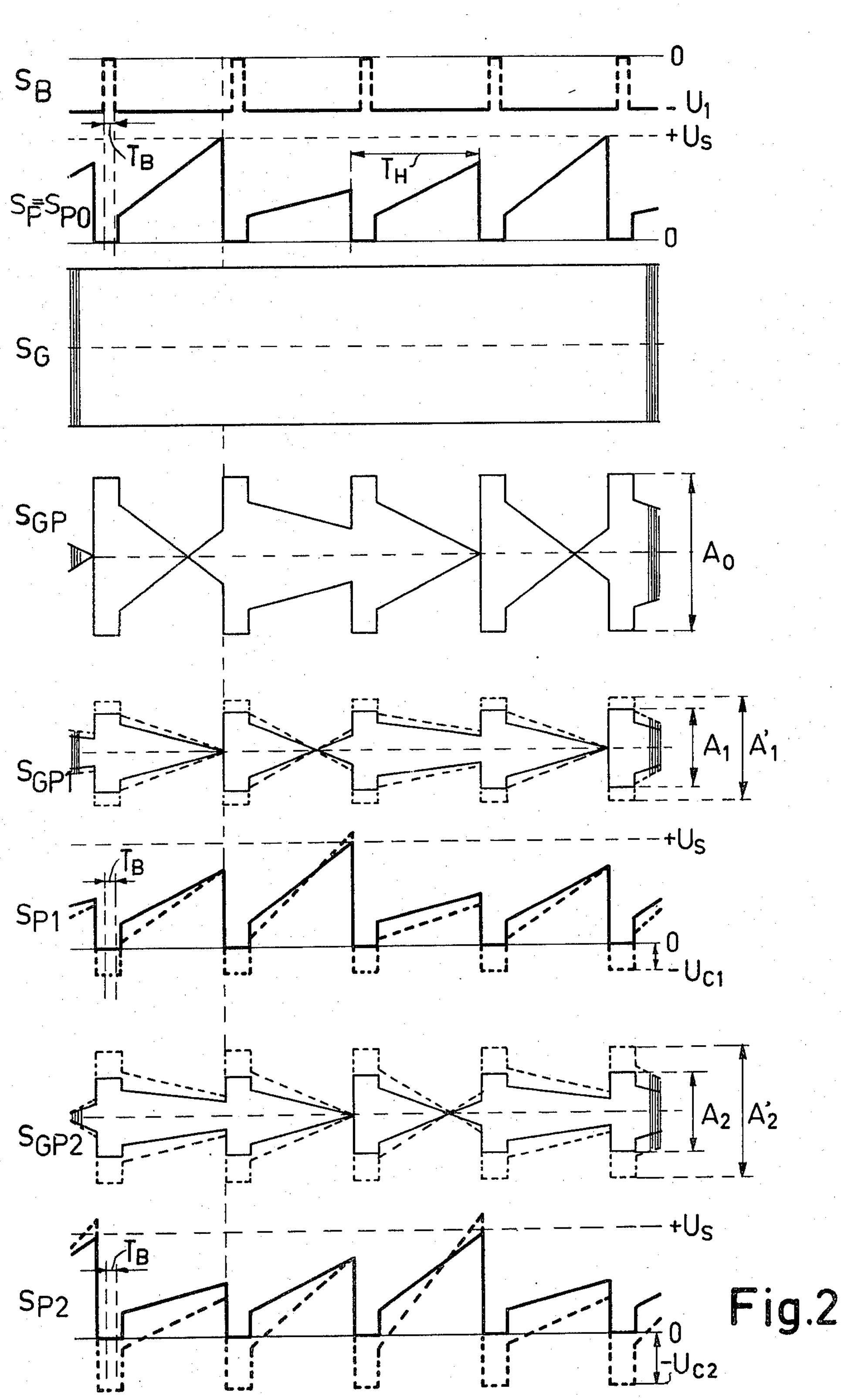

The invention will be described in greater detail by way of example with reference to the following Figures in which FIG. 1 shows an embodiment of an arrangement according to the invention and FIG. 2 shows some signals to explain the operation of the arrangement according to FIG. 1.

FIG. 1 shows an arrangement according to the invention provided with an input denoted by 1 for applying an image signal $S_P$ to be delayed. A possible shape of the signal $S_P$ is plotted in FIG. 2 as a function of time. In the signal $S_P$ of FIG. 2 the ground potential taken as a reference potential is denoted by 0 with which the so-called black level is associated. A line period, four of which are plotted in FIG. 2, is denoted by $T_H$. The image signal $S_P$ shown exhibits upon display a picture of lines varying in a cycle of three lines from dark grey to light grey, to a still lighter grey and to white. A voltage associated with the so-called peak white value and which is, for example, + 200 mV is denoted by $+U_S$. The black level with the ground potential O during the line blanking period is shown to be present in the signal $S_P$.

In FIG. 1 the input 1 is connected through a resistor 2 to ground and is furthermore connected to a non-inverting (+) input of an operational amplifier 3. The resistor 2 has, for example, the characteristic resistance of a cable (not shown) connected to the input 1 through which cable the signal $S_P$ is applied. The operational amplifier 3 is provided with an inverting (−) input which is connected through a feedback resistor 4 to the output thereof and which is connected through a resistor 5 to the output of an operational amplifier 6. Generally there applies that an input which is not fed back of an operational amplifier has a high input resistance and a resistively fed back (−) input has a low input resistance.

The (−) input of the amplifier 6 is connected to ground and the (+) input is connected through a transistor 7 to the output of the amplifier and through a capacitor 8 to ground. The transistor 7 is of the type having an isolated gate electrode. A source electrode of the transistor 7 is connected to the (+) input of the amplifier 6 and a drain electrode is connected to the output of the amplifier 3 while the gate electrode is connected to an input 9 to which a signal $S_B$ is applied which is plotted in FIG. 2. The signal $S_B$ has pulses having a duration of $T_B$ occurring from a voltage $-U_1$ of for example −6 V to the ground potential O. The pulses having a duration of $T_B$ periodically occur before the end of the line blanking period and render the transistor 7 conducting. The result of a clamping circuit (3–9) thus formed is that during the period $T_B$ the ground potential O occurs at the output of the amplifier 3. A deviation thereof possibly present at the beginning of the period $T_B$ is corrected because the amplifier 6 operating as a difference amplifier applies such a current to the (−) input of the amplifier 3 that the ground potential occurs at its output.

The feed-back clamping circuit (3–9) whose amplification factor is equal to one applies an image signal $S_{PO}$ to an output 10 with the same amplitude as the signal $S_P$, but in which signal the black level is brought to the ground potential O as a reference potential. For the signal $S_P$ shown in FIG. 2. it follows that the signal $S_{PO}$ is identical thereto, thus $S_P = S_{PO}$. Generally there applies that in a manner not shown the amplitude, i.e. the peak-to-peak value in the signal $S_P$ applied to the input 1 is fixed at a nominal value of for example, 200 mV while in case of a black level present therein and not being exactly at the ground potential O the clamping circuit (3–9) introduces this level into the signal $S_{PO}$.

The arrangement according to FIG. 1 is operative in the manner described as a signal handling arrangement which supplies an undelayed image signal $S_{PO}$ with a given amplitude and with the black level fixed at the ground potential O. To be able to perform the signal delay the arrangement is provided with an oscillator 11 which applies a carrier $S_G$ via a capacitor 12 to a modulator 13 to which furthermore the output of amplifier 3 is connected. Modulator 13 is formed with transistors 14 and 15 whose bases are connected to the output of the amplifier 3 and to ground, respectively. The emitters of the transistors 14 and 15 are connected together via resistors 16 and 17 and the connection point of the resistors is connected via a current source 18 to a voltage $-U_1$. The collector of the transistor 14 is connected to two interconnected emitters of two transistors 19 and 20. Likewise the transistor 15 is connected to two transistors 21 and 22. The bases of the transistors 20 and 21, and 19 and 22 are connected together while this also applies to the collectors of the transistors 19 and 21, and 20 and 22 which are furthermore connected through resistors 23 and 24, respectively, to a supply voltage $+U_1$. The interconnected bases of the transistors 20 and 21 and those of the transistors 19 and 22 are connected together through resistors 25 and 26 and the connection point of the resistors is connected to a bias $+U_2$ and to ground through a high-frequency bypass capacitor 27. While the carrier $S_G$ is applied to the bases of the transistors 20 and 21, the modulator 13 supplies the carrier modulated by the image signal $S_P = S_{PO}$(a modulated carrier $S_{GP}$) through a capacitor 28 which is connected to the collectors of the transistors 20 and 22.

FIG. 2 shows the envelopes of the carrier $S_G$ and the carrier ($S_{GP}$) modulated by the image signal $S_P = S_{PO}$. It appears that the modulator 13 is an amplitude modulator. To explain the operation the following applies. Due to the bias $+U_2$ at the bases of the transistors 19 to 22, these transistors can conduct. The transistors 14 and 15 may likewise conduct while having the ground potential or a higher potential on their bases while the current supplied by the current source 18 is distributed over the resistors 16 and 17 and this inversely proportional to the resistances thereof when the ground potential is present at the bases of the two transistors 14 and 15. When it is assumed that the resistor 16 has a higher value than the resistor 17, the transistor 14 conveys a smaller current than the transistor 15, which different currents are distributed over the transistors 19, 20 and 21, 22.. When, for example, a positively directed edge occurs in the carrier $S_G$ at the bases of the transistors 20 and 21, both transistors 20 and 21 will start to convey more current. Since the resistor 16 has a higher value than the resistor 17 the current through the transistor 20 will then increase to a lesser extent than that through the transistor 21. Due to the constant value of the current flowing through the transistor 15, the increase of the current flowing through the transistor 21 results in an equally large decrease of the current flowing through the transistor 22. The result is that the total current flowing through the resistor 24 with a relatively small increase via the transistor 20 and a relatively large decrease via the transistor 22 has decreased. A positive going edge in the carrier $S_G$ corresponds to a higher voltage in the signal $S_{GP}$, whereas a lower voltage results in case of a negative going edge. It is found that in the presence of ground potential (that is to say, black level) in the image signal $S_P = S_{PO}$ the modulator 13 passes the carrier with a given peak-to-peak value denoted in FIG. 2 by $A_O$. In case of a more positive image signal value the transistor 14 will start to convey more current so that likewise more current will flow through the resistor 24 via the transistor 20 resulting in a proportionally lower voltage occurring across the junction of the resistor 24 and the capacitor 28. It follows from the third line period of the image signal $S_P = S_{PO}$ denoted by $T_H$ in FIG. 2 and the envelope of the modulated carrier in the signal $S_{GP}$ corresponding thereto that at the image signal value at the end of this line period $T_H$ the increase or decrease of the current through the transistor 20 is equal to the decrease and increase through the transistor 22 so that the modulator 13 does not pass any carrier signal; the carrier is completely modulated. At the next fourth line period it is found that overmodulation occurs. The favourable aspect thereof is that the peak-to-peak value $A_O$ may be lower than in the absence of overmodulation which results in a more favourable proportioning of the modulator 13 and the subsequent circuits.

The modulated carrier, i.e. the signal $S_{GP}$ of FIG. 2 is applied in FIG. 1 through an adaptation circuit 29 to a delay circuit 30. The adaptation circuit 29 may be formed, for example, with an emitter follower circuit and an inductive compensation circuit for an input capacitance of the delay circuit 30. The delay circuit 30 having a delay time of one line period $T_H$ may be formed as a glass delay line. For this purpose the oscillator 11 provides, for example, a carrier $S_G$ having a frequency of 25 MHz whose amplitude is modulated by the image signal $S_P = S_{PO}$ with a bandwidth of 5 MHz. The delay circuit 30 is followed by a bandpass filter 31.

The bandpass filter 31 serves, with a bandwidth of ± 5 MHz about the carrier frequency, for the reduction of noise in the signal $S_{GP1}$ provided thereby, whose envelope is shown in FIG. 2.

FIG. 2 shows two envelopes of the signal $S_{GP1}$. The envelope having a peak-to-peak value of $A_1$ is considered, for example, as the desired nominal one, while that having a peak-to-peak value of $A_1'$ is then erroneous. The envelope having a peak-to-peak value of $A_1'$ occurs, for example, when due to a higher temperature of the delay circuit 30 formed as a glass delay line the damping therein has decreased. To illustrate the damping it is to be noted that the value $A_O$ has a voltage of, for example, 1 V and the value $A_1$ has a voltage of, for example, 1 mV.

A high-frequency amplifier 32 which is formed with a transistor 33 follows the filter 31 and its base is connected to the filter 31 and receives the signal $S_{GP1}$. The emitter of the transistor 33 is connected to a terminal of a capacitor 34 the other terminal of which is connected to ground. The capacitor 34 is a high-frequency bypass capacitor which is connected through a resistor 35 to the master contact of a change-over switch 36. One terminal 37 of the two terminals of change-over switch 36 is connected through a resistor 38 to the voltage $-U_1$. The collector of the transistor 33 is connected through a resistor 39 to the voltage $+U_1$ and is connected through a capacitor 40 to the (−) input of an operational amplifier 41 whose (+) input is connected to ground. A feedback resistor 42 is connected between the (−) input and the output of the amplifier 41. The high-frequency amplifier 32 is thus built up from the described components 33 to 42 inclusive.

After the high-frequency amplifier 32 the signal $S_{GP1}$ of, for example, 1 mV nominal value is amplified to 200 mV and is subsequently available for further processing with a second delay and for demodulation. Since the second delay is effected in more or less the same manner as the delay described, only some differences will be referred to after the description of the demodulation.

The operational amplifier 41 in the high-frequency amplifier 32 applies the amplified, modulated carrier $S_{GP1}$ to a demoodulator 43. For performing synchronous demodulation the carrier $S_G$ is applied to the demodulator 43 through a phase shifter 44. The demodulator 43 is formed in the same manner as the modulator 13 with the difference that the resistors present therein and corresponding to the resistors 16 and 17 have the same resistances. The phase shifter 44 serves to provide a phase shift $\phi_1$ which is adjustable between plus and minus a carrier period in order that the synchronous demodulator 43 supplies a maximum output signal. The output of the demodulator 43, which forms part of a high frequency circuit 11 to 44 inclusive thus formed, is connected to a low frequency amplifier 45 and is connected therein to the base of a transistor 46. The base and the emitter of the transistor 46 are connected to the supply voltage $+U_1$ through resistors 47 and 48, respectively. The collector of the transistor 46 is connected to ground through a resistor 49 and to the voltage $-U_1$ through a resistor 50 and an adjustable resistor 51 arranged in series. It will be apparent that the resistors 49, 50 and 51 constitute a potential divider 52 in which it is essential that the resistor 49 has a relatively low value relative to the series resistance of the resistors 50 and 51. The junction between the resistors 49 and 50 of the potential divider 52 is denoted by 53 and is connected to the (+) input of an operational amplifier 54 whose (−) input is connected to ground through a resistor 55 and to its output through a feedback resistor 56. The output of the amplifier 54 which is connected to an output 57 of the low-frequency amplifier 45 conveys an image signal $S_{P1}$ delayed once a line period $T_H$.

In order to ensure that apart from the desired delay the image signal $S_{P1}$ is furthermore identical to the image signal $S_P = S_{PO}$, the arrangement according to FIG. 1 not only includes the potential divider 52 but also a control circuit 58. The output 57 of the low-frequency amplifier 45 in the control circuit 58 is connected to a source electrode of a transistor 59 of the type having an isolated gate electrode. The gate electrode of transistor 59 is connected to an input 60 to which the signal $S_B$ of FIG. 2 is applied. The drain electrode of the transistor 59 is connected to the (−) input of an operational amplifier 61 whose (+) input is connected to ground. By incorporating a capacitor 62 between the (−) input and the output of the amplifier 61 an integrating amplifier (59–62) is formed in which the transistor 59 is active as a controlled switch having a resistance. The output of the amplifier 61 is connected to an output terminal 63 of the control circuit 58. The output terminal 63 which conveys a control voltage in the manner to be described, forms part of the change-over switch 36 and constitutes a terminal thereof.

To explain the operation of the control circuit 58 reference is made to the signals $S_{GP1}$ and $S_{P1}$ in FIG. 2. It has been stated in the description of the signal $S_{GP1}$ that the signal with the envelope having a peak-to-peak value of $A_1$ is to be considered as nominal and that the signal of the value $A_1'$ is to be considered erroneous. Starting from the nominal signal $S_{GP1}$ having a value of $A_1$ an associated nominal signal $S_{P1}$ may be obtained by controlling the circuit according to FIG. 1. Let it be assumed that a signal $S_P$ is applied as a test signal to the input 1, which signal varies during each line period $T_H$ between the black level having the ground potential O and the peak white value having the voltage $+U_S$ as is shown in FIG. 2 for only the first and fourth line periods $T_H$. The signal $S_P = S_{PO}$ is obtained at the output 10 and the object is to obtain a signal $S_{P1}$ at the output 57 which signal, in a delayed form, is identical to the signal $S_P = S_{PO}$ periodically varying between the black level and the peak white value. During the adjustment test the switch 36 is connected to the terminal 37 so that the transistor 33 conveys a given dc bias determining its amplification. The dc bias determines the operating point of the transistor 33. Subsequently the phase shifter 44 is displaced in such a manner that the demodulator 43 provides a maximum output signal which results in an optimum synchronous detection. Then the feedback resistor 56 in the low-frequency amplifier 45 is adjusted in such a manner that the peak-to-peak value of the signal $S_{P1}$ is equal to that of the signal $S_P = S_{PO}$. In this case it has, however, not been determined between which absolute voltage values the signal $S_{P1}$ varies, but only the value of the difference between the minimum and the maximum value has been fixed. The potential divider 52 is provided for fixing the absolute voltage values. By adjusting the resistor 51 the junction 53 can be given such a negative bias that in the presence of the black level in the signal $S_{P1}$ the ground potential is introduced at the output 57. The adjustment of the resistor 51 does not substantially influence the amplification of the transistor 46 because the resistance of the series arranged resistors 50 and 51 is much higher, for example, fifty times higher than that of the resistor 49.

After the described adjustment the supply of the signal $S_P = S_{PO}$ shown in FIG. 2 to the input 1 has the result that, for example, the signal $S_{P1}$ shown in solid lines occurs at the output 57 when the delay circuit 30 supplies the signal $S_{GP1}$ having the nominal peak-to-peak value $A_1$. A temperature fluctuation of the delay circuit 30 would, without further steps, result in the performed adjustment being no longer correct. In case of an increased temperature resulting in a lower signal damping the signal $S_{P1}$ shown in broken lines would occur at the output 57 when the signal $S_{GP1}$ having the peak-to-peak value $A_1$ is supplied. A comparison of the signal $S_P = S_{PO}$ and the broken line signal $S_{P1}$ shows that in addition to the desired delay of a line period $T_H$ an inadmissible signal distortion has taken place. In this case only one absolute value is correct in the signal $S_{P1}$, namely the value at which the carrier is completely modulated to an amplitude equal to zero. In fact, the temperature fluctution in the delay circuit 30 does not have any influence thereon as is apparent from the signal $S_{GP1}$.

Signal distortion is avoided by connecting the change-over switch 36 after the described adjustment to the terminal 63, which is the output terminal of the control circuit 58. It follows from the description of the broken-line signal $S_{P1}$ in FIG. 2 that a temperature increase of the delay circuit 30, without the use of control circuit 58, results in a black level located on a negative potential instead of on the ground potential O. The voltage $-U_{C1}$ plotted in FIG. 2 at the signal $S_{P1}$ is a measure of the difference between the peak-to-peak values $A_1$ and $A_1'$ of the signal $S_{GP1}$. By applying the voltage $-U_{C1}$ during the pulse period $T_B$ of the signal $S_B$ via the switching transistor 59 to the operational amplifier 61, which is active as a difference amplifier relative to ground potential, this amplifier provides a control voltage for the terminal 63. The control voltage at terminal 63 reduces the dc bias through the resistor 35 so that the signal amplification of the transistor 33 decreases until the ground potential O occurs during each period $T_B$ at the output 57. The result is that the control voltage across the output terminal 63 of the control circuit 58 ensures that the black level in the signal $S_{P1}$ at the output 57 is at ground potential. Due to the previous adjustment of the resistor 56 it is then ensured that the signals $S_{P1}$ and $S_P = S_{PO}$ have a (delayed) identical shape.

The use of the integrating operational amplifier 61 having a time constant of, for example, several dozen television field periods provides that a direct control voltage occurs at the terminal 63 independent of switching on or switching off the switching transistor 59. If in case of a voltage of, for example, $-0.7$ V at the emitter of the transistor 33 a direct control voltage of approximately $-1$ V is to occur at the terminal 63 and if the amplification factor of the amplifier 61 is, for example, $10^5$, the black level at the output 57 has a value of $+0.01$ mV which relative to a peak white value $U_S =$ 200 mV in the signal $S_{P1}$ is negligibly small.

It is found that the control circuit 58 is active with the aid of the amplifier 61 as a comparator circuit operating relative to ground as a reference potential for determining the black level and that it is active as a clamping circuit, through the high frequency amplifier 32, with a control voltage derived from the comparator. When instead of a delay circuit 30 suitable for an amplitude-modulated signal a delay circuit suitable for frequency modulation is chosen, the frequency of the oscillator 11 in the high-frequency circuit (11–44) can be controlled in such a manner that in the presence of the black level a signal having a fixed frequency is applied to the (frequency) demodulator 43. A reactance circuit might then be utilized which provides for both the frequency modulation and the black level frequency control.

For obtaining the image signal which is delayed twice a line period it is sufficient to duplicate part of the described arrangement according to FIG. 1, namely as from the capacitor 28 up to and including the output terminal 63 with the control voltage and to connect the circuit (28–63) to the output of the operational amplifier 41. The numerals referring to some components have indices in FIG. 1. For the adaptation circuit 29' there applies that, relative to the described arrangement 29, it also provides a signal amplification so as to increase the said 200 mV peak-to-peak value provided by the amplifier 41 to the 1 V peak-to-peak value suitable for supply to the delay circuit 30'. The circuit 30' applies through the bandpass filter 31' a signal $S_{GP2}$ whose envelope is plotted in FIG. 2. It is shown for the phase shifter 44' that it has a phase shift at an angle of $\phi_2$ which phase shift need not be equal to that of the phase shifter 44. In the manner as described with reference to the signal $S_{P1}$ delayed once, a signal $S_{P2}$ delayed twice is obtained at the output 57' which signal is plotted in FIG. 2.

In FIG. 2 a nominal peak-to-peak value $A_2$ is plotted for the signal $S_{GP2}$ with which the image signal $S_{P2}$ delayed twice and shown in solid lines is associated. A deviation from the nominal peak-to-peak value $A_2$ to an erroneous value $A_2'$ would result in the line blanking period giving the operational amplifier 54' a voltage $-U_{C2}$ instead of the ground potential. Such a control voltage will be impressed on the output terminal 63' through the operational amplifier 61' that the said deviation is eliminated.

FIG. 1 shows that the arrangement is formed with two delay circuits 30 and 30'. It is alternatively possible to use only one circuit 30 when quadrature modulation with two 90° phase-shifted carriers is used. After the signal is delayed once, the image signal is again passed through the same delay circuit 30 after demodulation and phase-shifted modulation. In this case only one control circuit 58 is to be used.

Instead of a delay circuit 30 or 30' having a delay of one line period $T_H$ it is alternatively possible to use a delay circuit having a delay time of approximately one field period for vertical aperture correction in an interlaced television system.

As compared with frequency modulation the use of amplitude modulation has the advantage that, without demodulation and remodulation, the second delay circuit 30' can be directly connected to the first high frequency amplifier 32. In fact, for frequency modulation a separate modulator having its own controlled oscillator would have to be used for each delay circuit 30 and 30'.

It has been described in the foregoing how the temperature influence on the damping in the delay circuits 30 and 30' can be corrected. Ageing phenomena of the delay circuits 30 and 30' are corrected in the same manner. Signal correction is also effected when the modulator 13 undergoes such influences. For the modulator 13 it is only important that the resistances of the resistors 16 and 17 are accurately determined. It has been described that the demodulator 43 is formed in substantially the same manner as the modulator 13 with the difference that the resistors corresponding to the resistors 16 and 17 have equal values. For the demodulator 43 or 43' a more stringent requirement applies than for the modulator 13, namely the current source (18) present therein must be sufficiently stabilized. If this were not the case, a possible variation in the direct current provided by the current source (18) would result in a different direct voltage drop across the resistor (24) connected to the output of the demodulator 43 or 43'. As a result the transistor 45 or 45', whose base is connected to the said resistor (24) in the demodulator 43 or 43', obtains a shifted adjusting point having a different amplification. Consequently the adjustment performed with the aid of the resistor 56 or 56' is set aside so that the control circuit 58 or 58' brings the black level in the image signal which is delayed once or twice to the ground potential, but the delayed image signals are furthermore no longer identical to the undelayed image signal. By forming the current source (18) in the demodulator 43 or 43' as a stabilised source, it has been achieved that the demodulator 43 or 43' is stabilised against variations in the supplied direct voltage associated with the black level in the image signal.

Both the clamping circuit (3–9) and the control circuit 58 or 58' employ the respective switching transistors 7, 59 and 59' instead of which alternatively a peak detection circuit might be used for the described negative amplitude modulation with the black level corresponding to the maximum amplitude of the transmitted carrier. When using positive amplitude modulation with the black level corresponding to a minimum amplitude, the switching transistors 7, 59 and 59' would be necessary.

The arrangement according to the invention is particularly suitable for use in a vertical aperture corrector to be used in a television camera for which stringent requirements are imposed on the equality of the otherwise delayed image signals. It has been proposed to use a vertical aperture corrector also in television receivers, which receivers therefore satisfy requirements of a very high image quality. The arrangement according to the invention may also be used in this case.

What is claimed is:

1. A circuit arrangement for delaying a television image signal to provide an output signal with a black level at a reference potential, said circuit comprising a high frequency circuit including an carrier oscillator, a modulator having a first input means for receiving said television image signal, a second input means coupled to said oscillator, and an output, a first delay circuit having an input coupled to said modulator output and an output, and a first demodulator having an input coupled to said first delay circuit output, and an output means for providing said output signal; and first control circuit means coupled to said demodulator output and said high frequency circuit, said first control circuit including both a clamping circuit means for setting the black level of said output signal to a reference potential and a means for comparing said black level with said reference level and for generating and applying a control voltage to said high frequency circuit.

2. An arrangement as claimed in claim 1 further comprising means for stabilizing the demodulator against variations in the supplied direct voltage associated with the black level in the image signal.

3. An arrangement as claimed in claim 1, wherein the modulator comprises an amplitude modulator and the demodulator comprises an amplitude demodulator and further comprising a first high-frequency amplifier coupled between the delay circuit and said demodulator and to said control circuit means.

4. An arrangement as claimed in claim 3, further comprising a second delay circuit coupled to said high frequency amplifier a second high-frequency amplifier coupled to said second delay circuit, and a second demodulator coupled to said second high frequency amplifier, and a second control circuit coupled to said second demodulator and to the second high-frequency amplifier.

5. An arrangement as claimed in claim 3 wherein the first high-frequency amplifier comprises a transistor having a base coupled to the first delay circuit, a collector coupled to a supply voltage, and an emitter coupled to the said control circuit means.

6. An arrangement as claimed in claim 5, further comprising a change-over switch coupled to the emitter and to a bias supply.

7. An arrangement as claimed in claim 1 further comprising a clamping circuit means for determining the black level in the image signal coupled to receive said signal and to said first input of the modulator.

8. An arrangement as claimed in claim 1 further comprising a low-frequency amplifier coupled between said demodulator and said control circuit and having an operational amplifier a first input of which is connected to the said reference potential and a second input, a potential divider including at least two resistors having different values, the resistor having the larger value comprising an adjustable resistor, said resistors forming a junction coupled to said amplifier second input.

9. An arrangement as claimed in claim 8, further comprising a transistor having a collector coupled to said junction, an emitter coupled to a supply voltage, and a base coupled to the demodulator.

10. An arrangement as claimed in claim 1 further comprising a low frequency amplifier coupled to said demodulator and wherein the control circuit comprises a comparator circuit comprising an integrating operational amplifier having two inputs, one input being connected to the reference potential, a switch coupled to the remaining input, said switch being closed during the line blanking period, and being coupled to the output of the low-frequency amplifier.

* * * * *